United States Patent
Yokoyama et al.

(10) Patent No.: US 7,417,833 B2
(45) Date of Patent: Aug. 26, 2008

(54) MAGNETIC RECORDING AND REPRODUCING APPARATUS HAVING ELEMENT FOR CORRECTING MISALIGNED MAGNETIZATION DIRECTION

(75) Inventors: Yukimasa Yokoyama, Kawasaki (JP); Ryuichi Sato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 334 days.

(21) Appl. No.: 11/111,856

(22) Filed: Apr. 22, 2005

(65) Prior Publication Data
US 2005/0243480 A1 Nov. 3, 2005

Related U.S. Application Data

(63) Continuation of application No. PCT/JP03/05534, filed on Apr. 30, 2003.

(51) Int. Cl.
*G11B 5/33* (2006.01)
(52) U.S. Cl. .............................. 360/324.11; 360/324.12
(58) Field of Classification Search ............ 360/324.12, 360/324.1–324.2
See application file for complete search history.

(56) References Cited

U.S. PATENT DOCUMENTS

| | | | |
|---|---|---|---|
| 6,025,979 A * | 2/2000 | Yamane et al. ............ | 360/324.1 |
| 6,519,122 B1 * | 2/2003 | Kakihara ................ | 360/324.12 |
| 6,724,583 B2 * | 4/2004 | Seigler et al. .......... | 360/324.12 |
| 7,196,881 B2 * | 3/2007 | Shi et al. ............... | 360/324.12 |
| 2004/0160708 A1 * | 8/2004 | Zheng et al. ........... | 360/324.12 |

FOREIGN PATENT DOCUMENTS

| | | |
|---|---|---|
| JP | 6-314417 | 11/1994 |
| JP | 7-65327 | 3/1995 |
| JP | 8-55312 | 2/1996 |
| JP | 8-77519 | 3/1996 |
| JP | 9-282613 | 10/1997 |
| JP | 10-55501 | 2/1998 |
| JP | 10-91923 | 4/1998 |
| JP | 11-25430 | 1/1999 |
| JP | 11-86224 | 3/1999 |
| JP | 11-102508 | 4/1999 |
| JP | 2000-348310 | 12/2000 |
| JP | 2002-208121 | 7/2002 |

OTHER PUBLICATIONS

Japanese Office Action Sep. 26, 2006.
Office Action dated Jan. 25, 2007 with English Translation.

* cited by examiner

*Primary Examiner*—A. J. Heinz
(74) *Attorney, Agent, or Firm*—Kratz, Quintos & Hanson, LLP.

(57) ABSTRACT

The invention provides a magnetic recording and reproducing apparatus having magnetic field applying unit applying a magnetic field to a magnetoresistive element to correct a misaligned magnetization direction of the magnetoresistive element. The magnetic field applying unit can be used to correct a misaligned magnetization direction of a free layer of a giant magnetoresistive element. A magnetic field applying unit controller controls the magnetic field applying unit to adjust a magnetization direction and intensity of a magnetic field of the giant magnetoresistive element. The magnetic field applying unit controller can control the magnetic field applying unit to apply a magnetic field only during a data reading time, and to increase the intensity of the application magnetic field during a data re-reading time. The magnetic field applying unit is mounted, corresponding to a head on a suspension that supports a head slider, on a surface of the suspension opposite to the surface on which the head is mounted.

8 Claims, 5 Drawing Sheets

MAGNETIC RECORDING AND REPRODUCING APPARATUS HAVING ELEMENT FOR CORRECTING MISALIGNED MAGNETIZATION DIRECTION

CROSS-REFERENCE TO RELATED APPLICATION

This application is a continuation application and is based upon PCT/JP03/05534 (WO 2004/097807), filed on Apr. 30, 2003.

BACKGROUND OF THE INVENTION

1) Field of the Invention

The present invention relates to a magnetic recording and reproducing apparatus and, more particularly, to a magnetic recording and reproducing apparatus having a magnetoresistive head.

2) Description of the Related Art

In recent years, the recording density of a magnetic recording and reproducing apparatus has been extremely improved based on the employment of a head using the magnetoresistive effect. Particularly, along with practical use of a giant magnetoresistive head, the recording density has been improved significantly.

In general, a GMR (giant magnetoresistive) element consists of a free layer, a spacer layer, a pinned layer, and an antiferromagnetic layer. The pinned layer is magnetized in the element height direction, and the free layer is magnetized in the track width direction.

The magnetization direction of the free layer changes in the element height direction based on a change of a magnetic field of a magnetic recording medium. In this case, resistance becomes a minimum when the magnetization direction of the pinned layer and the magnetization direction of the free layer are mutually in parallel and also when both magnetization directions are the same. On the other hand, when both magnetization directions are opposite or anti-parallel, the resistance becomes a maximum. Therefore, information recorded on the magnetic recording medium can be read by detecting a change in the resistance.

It is most suitable that the magnetization direction of the pinned layer and the magnetization direction of the free layer of the GMR element form an angle of 90 degrees, when there is no external magnetic field. At this time, the output of the GMR element becomes a maximum, and positive/negative asymmetry of the output (i.e., asymmetry of a positive-direction output and a negative-direction output) becomes zero. However, according to GMR elements manufactured in an actual process, the angle formed between the magnetization direction of the pinned layer and the magnetization direction of the free layer is not 90 degrees. Because the magnetization state depends on the manufacturing process and the size of the GMR elements, there is a variance in the angle formed between the magnetization direction of the pinned layer and the magnetization direction of the free layer. Due to this variance, not all of a large number of GMR elements operate at an optimum bias point, and a predetermined maximum output cannot be obtained.

In this case, some characteristics can be adjusted by changing the sense current. In other words, the magnetization direction of the free layer can be slightly changed using a change in the magnetic field generated by the sense current. However, increasing the sense current causes an unstable characteristic, and this has a risk of bringing about disconnection due to electromigration. Consequently, it is difficult to control the head characteristics in actual practice.

Therefore, under the present situation, certain threshold values are provided for the output and the positive/negative asymmetry of a GMR head, and a head within this range of the threshold values is selectively used. However, according to this method, GMR heads cannot sufficiently exhibit a constant performance, because variance is permitted. This variance in characteristic also becomes a cause of poor yields in the manufacturing of the GMR heads. Further, even when a GMR head is in an optimum bias state at the beginning, the magnetized state of the pinned layer and the free layer will change due to various causes, such as heating, after the GMR head is mounted on a device. This may degrade the head characteristic and, further, generate a read error.

Conventionally, the bias is not adjusted from outside of the head to obtain an optimum characteristic during a data read operation. Japanese Patent Application Unexamined Publication No. 10-55501 discloses provision of a bias magnetic field generating element that is controlled according to head positional error information so as to optimize a positional relationship between a recording head and a reproducing head, thereby adjusting a sensitivity distribution of the reproducing head. However, in this publication, application of a magnetic field to the reproducing head to give a primary optimum bias to the reproducing head is not disclosed.

SUMMARY OF THE INVENTION

In view of the above problems, it is an object of the present invention to provide a magnetic recording and reproducing apparatus that can adjust the bias to an optimum bias point, even when there is a variance in output characteristics, and that can provide a maximum output with zero positive/negative asymmetry of the output.

In order to achieve the above object, according to the present invention, a magnetic recording and reproducing apparatus includes a magnetic field applying unit to apply a magnetic field to a magnetoresistive element to correct a misaligned magnetization direction of the magnetoresistive element. The magnetic field applying unit can apply a magnetic field to the magnetoresistive element in the height direction of the magnetoresistive element.

The magnetoresistive element is a giant magnetoresistive element. The magnetic field applying unit can correct a misaligned magnetization direction of a free layer of the giant magnetoresistive element.

The magnetic recording and reproducing apparatus also includes a magnetic field applying unit controller. The magnetic field applying unit controller can control the magnetic field applying unit to adjust the magnetization direction and the magnetic field intensity of the magnetoresistive element.

The magnetic field applying unit controller can control the magnetic field applying unit to apply a magnetic field only during a data reading time, and can control the magnetic field applying unit to increase the intensity of an application magnetic field only during a data re-reading time.

The magnetic field applying unit controller can control the magnetic field applying unit such that the intensity of a magnetic field applied by the magnetic field applying unit is within an intensity range of the magnetic field in which data of the magnetic recording medium is not erased. The magnetic field applying unit controller controls the magnetic field applying unit to increase the intensity of the magnetic field of the magnetic field applying unit during a period other than the reading time. During the reading time, the magnetic field applying unit controller sets conditions to read data without applying a magnetic field, and detects an error rate, thereby setting an intensity range of the magnetic field applied by the magnetic field applying unit.

Further, the present invention provides a suspension that is used in a magnetic recording and reproducing apparatus, the suspension having a wiring pattern on both surfaces of the suspension. The suspension can have a head slider mounted on one surface, and can have an electromagnet mounted on the other surface.

BRIEF DESCRIPTION OF THE DRAWINGS

The present invention is explained below with reference to accompanying drawings.

DETAILED DESCRIPTIONS

In order to make clear the effect obtained from the present invention, a magnetic recording and reproducing apparatus using a GMR element, to which the present invention is not applied, is explained first.

Figure 6:
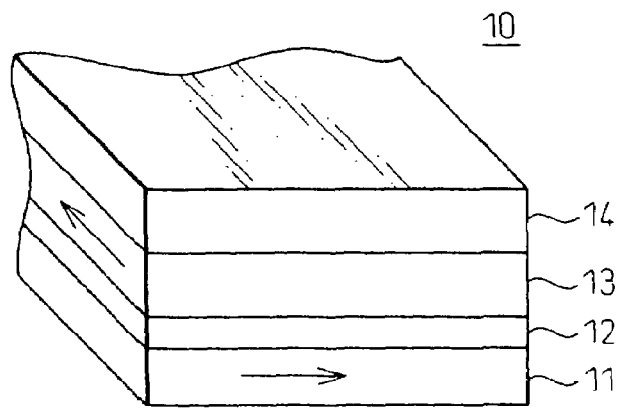
FIG. 6 is a perspective view of a schematic configuration of a known GMR element.

FIG. 6 is an explanatory diagram of a configuration of a general GMR element. In FIG. 6, a surface of the GMR element facing a magnetic recording medium is shown. A GMR element 10 includes a free layer 11, a spacer layer 12, a pinned layer 13, and an antiferromagnetic layer 14. The four layers that constitute the GMR element face the recording medium as a reading head. The four layers are laminated in a direction to correspond to a circumferential direction of the recording medium. Usually, a ferromagnetic substance of NiFe/Co alloy is used for the free layer 11 and the pinned layer 13 respectively, copper is used for the spacer layer 12, and an antiferromagnetic substance of PdPtMn is used for the antiferromagnetic layer 14. The antiferromagnetic layer 14 that is in contact with the pinned layer 13 fixes the magnetization direction of the pinned layer 13 to one direction. On the other hand, the free layer 11 is magnetized in a track width direction in parallel with the recording medium. Magnetization directions are indicated by arrowheads in FIG. 6.

The magnetization direction of the free layer 11 changes in a perpendicular direction based on a change of a magnetic field of the magnetic recording medium on which information is recorded. In this case, resistance becomes a minimum when the magnetization direction of the pinned layer 13 and the magnetization direction of the free layer 11 are mutually in parallel. On the other hand, when the magnetization directions are opposite or anti-parallel, the resistance becomes a maximum. Therefore, information recorded on the magnetic recording medium can be read by detecting a change in the resistance.

Figure 7:
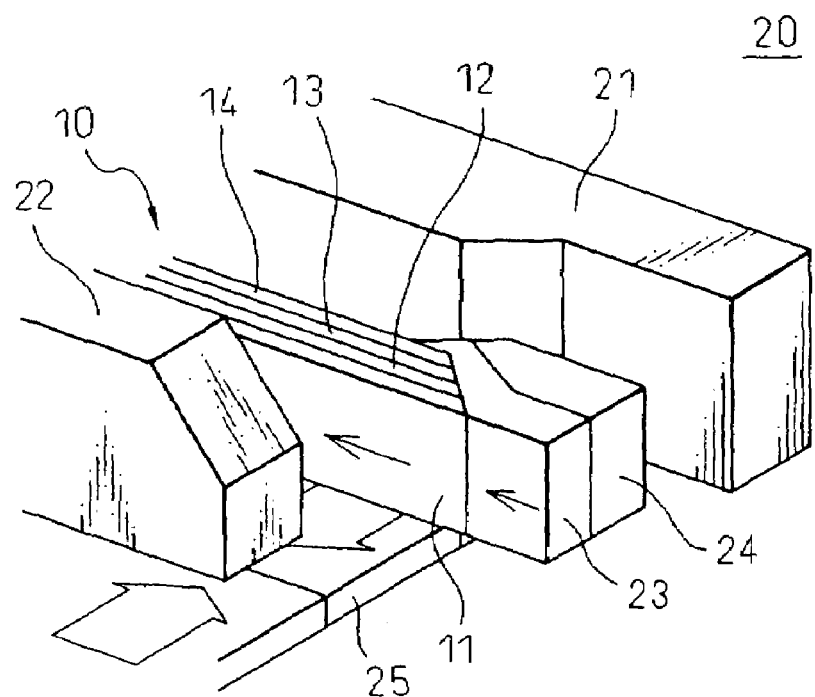
FIG. 7 is a perspective view of a schematic configuration of a known GMR head.

FIG. 7 is a perspective view of a conventional GMR head having a GMR element that is used in a magnetic recording and reproducing apparatus. A GMR 20 faces a rotating magnetic recording medium 25 from above the recording medium, with a small gap between the GMR head and the magnetic recording medium. The GMR head 20 has a GMR element 10 sandwiched between two shields of an upper shield 21 and a lower shield 22. At both ends of the GMR element 10, there is provided a magnetic domain control film 21 made of a magnetic substance having high retention to control the magnetization direction of the free layer 11 of the GMR element 10. The magnetic domain control film 23 is magnetized in the track width direction. The free layer 11 of the GMR element is magnetized in the track width direction, based on a magnetic field generated from the magnetized magnetic domain control film 23. A low-resistance terminal 24 is connected to the magnetic domain control film 23. A sense current is supplied to the GMR element 10 through this terminal 24. The GMR head 20 having the above configuration outputs a change in resistance of the flowing current as a change in voltage.

As described above, the magnetization of the pinned layer is in the height direction of the element, and the magnetization of the free layer is in the track width direction. It is most suitable that the magnetization direction of the pinned layer and the magnetization direction of the free layer of the GMR element form an angle of 90 degrees. At this time, an output of the GMR element becomes a maximum, and positive/negative asymmetry becomes zero.

Figure 8:
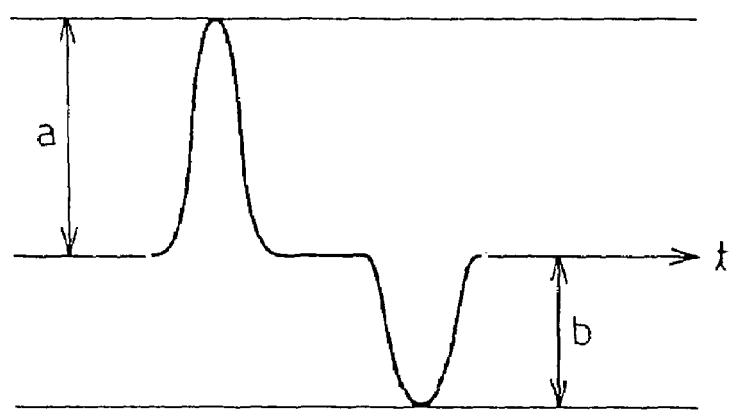
FIG. 8 is an explanatory diagram of positive/negative asymmetry of an output from a head.

The positive/negative asymmetry is expressed as a percentage of $|(a-b)/(a+b)|$, where a represents a size of a signal output in a positive direction, and b represents a size of a signal output in a negative direction, as shown in FIG. 8. The positive/negative asymmetry becomes zero, if a=b. When a=b, an optimum bias point is obtained. However, as a magnetization state depends on a manufacturing process and an element size, there is a variance in the angle formed between the magnetization direction of the pinned layer and the magnetization direction of the free layer. Due to this variance, not all of a large number of GMR elements operate at the optimum bias point, and a predetermined maximum output cannot be obtained, as described above.

A magnetic recording and reproducing apparatus according to the present embodiment is explained below with reference to FIG. 1 to FIG. 5.

Figure 1:
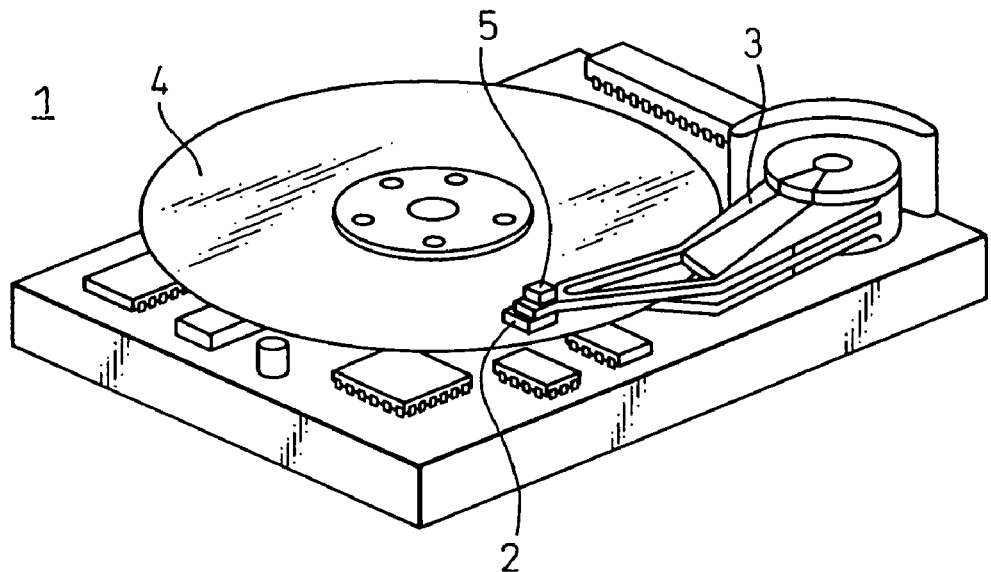
FIG. 1 is a perspective view of a magnetic recording and reproducing apparatus according to one embodiment of the present invention.

FIG. 1 is a perspective view of the magnetic recording and reproducing apparatus according to the embodiment of the present invention. A head slider on which a head 2 having a GMR head is mounted is supported by a suspension. The head 2 is disposed to face a magnetic recording medium 4. With the rotation of the magnetic recording medium 4, the head 2 moves in a radial direction of the magnetic recording medium, and the GMR head reads information from the magnetic recording medium. Information is recorded on both surfaces of the magnetic recording medium 4, and a head 2 is provided to face each surface. While the magnetic recording and reproducing apparatus has one recording medium 4 in the present example, the magnetic recording and reproducing apparatus usually has plural recording mediums, such as four recording mediums, on one rotation axis. If the apparatus has four recording mediums, the number of heads is eight.

An electromagnet 5 is disposed on the upper surface of the suspension 3 near the head 2 having the GMR head. The electromagnet 5 can apply a desired magnetic field in a direction perpendicular to the recording medium 4 corresponding to a current supplied to the electromagnet 5. In other words, by controlling flow of the current through the electromagnet 5 to change the intensity of the magnetic field that is perpendicularly applied to the recording medium by the electromagnet 5, a direction and an intensity of the magnetic field of the free layer can be adjusted to a desired direction and a desired intensity. Therefore, even when an angle formed between the pinned layer magnetization direction and the free layer magnetization direction is misaligned, the angle can be corrected to the ideal angle of 90 degrees. Consequently, the output of the GMR head can be maximized, and the positive/negative asymmetry can be set to zero.

In order to obtain the optimum bias point, the current to be supplied to the electromagnet 5 can be obtained as explained below. When the recording and reproducing apparatus has plural heads, a current to be supplied to the electromagnet is determined for each head.

Figure 2:
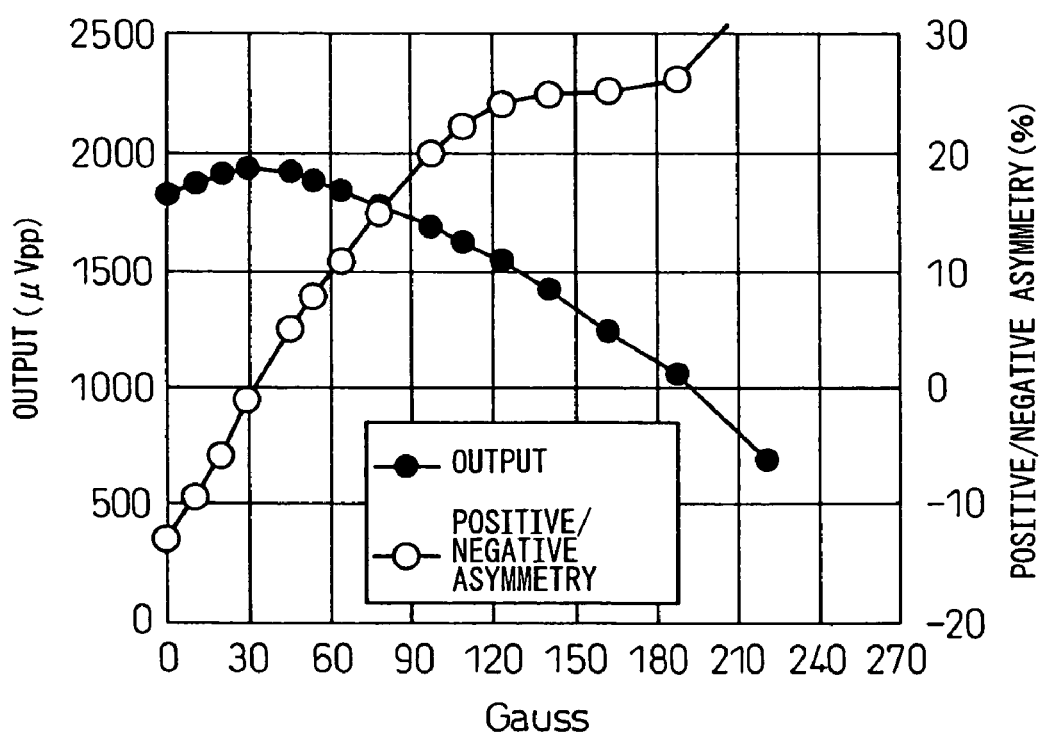
FIG. 2 is a characteristic diagram of a GMR (giant magnetoresistive) head according to the embodiment of the present invention.

FIG. 2 is a characteristic diagram of a GMR head, indicating the output of read data (in black circles) and the positive/negative asymmetry (in white circles) that are plotted while actually changing the magnetic field applied by the electromagnet 5. The horizontal axis represents a magnetic field (in Gauss) that is applied by the electromagnet 5, and the vertical axis at the left side represents an output voltage (in $\mu$Vpp), and the vertical axis at the right side represents positive/negative asymmetry (in percentage). The optimum bias point is obtained when an external magnetic field of about 30 Gauss is applied. As compared with the initial state when the external magnetic field is zero (i.e., the output is 1,800 $\mu$V, and the positive/negative asymmetry is −12%), the output is improved from 1,800 $\mu$V to 2,000 $\mu$V, i.e., by ten percent, and the positive/negative asymmetry becomes zero.

At present, positive/negative asymmetry in the range from +20 to −20 percent is used as a permissible range. A head having this range of positive/negative asymmetry is employed for the apparatus. According to the present invention, the positive/negative asymmetry can be set to substantially zero, and the GMR head can be operated in the optimum bias state. Even when the GMR element has positive/negative asymmetry exceeding the range of +20 to −20 percent, the positive/negative asymmetry can be improved when the present invention is applied. Therefore, GMR elements that are conventionally abandoned can be used based on the application of the present invention.

As explained above, the optimum magnetic field is determined by actually measuring the magnetic field for each head. Therefore the optimum bias point can be easily determined for individual heads.

Figure 3:
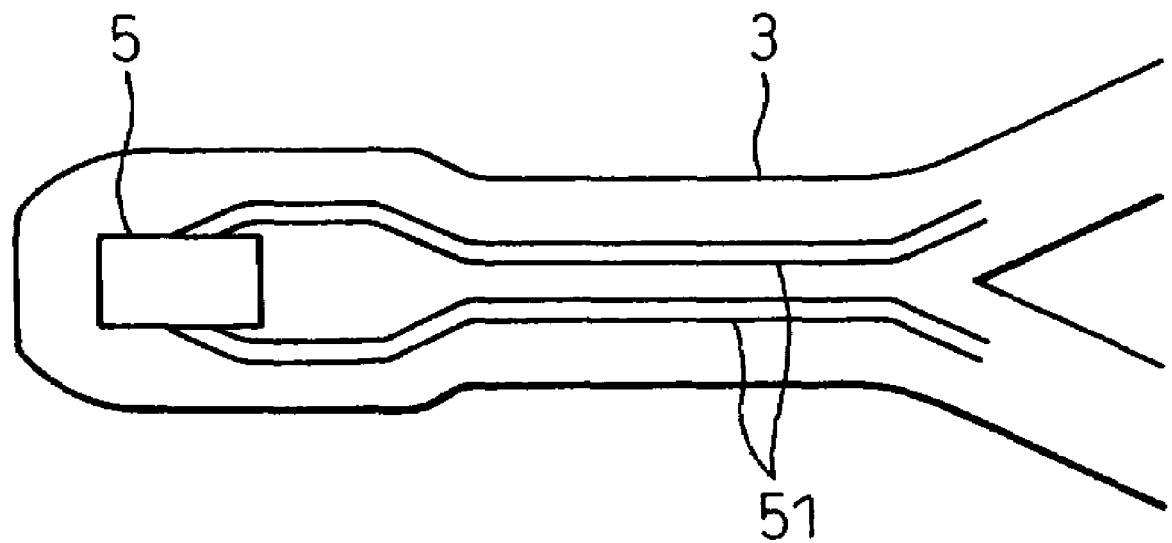
FIG. 3 is a top-plan view of a suspension that is used for the magnetic recording and reproducing apparatus according to the embodiment of the present invention.

A pair of twisted lines can be used to conduct electricity to the electromagnet 5 that is mounted on the suspension 3. Alternatively, a wiring 51 to the electromagnet 5 can be formed on the upper surface of the suspension 3, as shown in FIG. 3. Conventionally, a wiring to the head is formed on the surface (i.e., the back surface in FIG. 3) facing the magnetic recording medium 4 of the suspension. Therefore, the wiring to the electromagnet 5 can be formed by using such a wiring process, for example, printing wiring, or by etching. While the electromagnet 5 is connected to the front end of the wiring 51 in the present example, instead of this method, the wiring can be formed in a spiral coil to form the electromagnet 5. A control circuit that controls the electromagnet 5 can be mounted on the suspension 3.

While the electromagnet 5 is provided on the suspension 3 in the present example, the electromagnet 5 can be provided in the casing of the magnetic recording and reproducing apparatus. When only one recording medium is used, as in the present example, the electromagnet 5 can be disposed on the casing facing the recording surface of the recording medium, at a suitable position corresponding to the head moving track.

Figure 4:
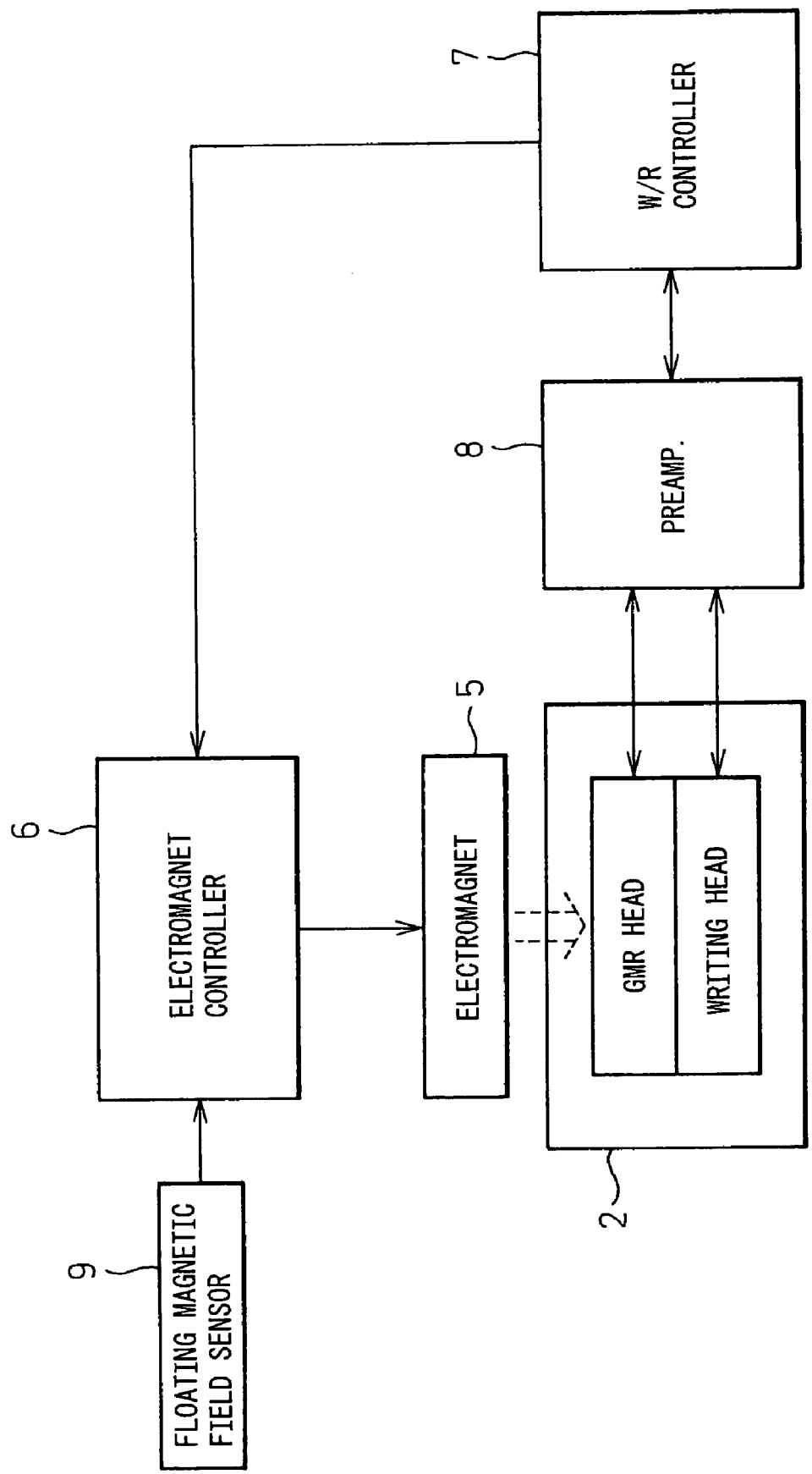
FIG. 4 is a block diagram of a control circuit according to the embodiment of the present invention.

FIG. 4 is a block diagram showing an outline of the control circuit according to the embodiment of the present invention. The head 2 includes a GMR head as a reading head, and a writing head, and is connected to a write/read controller (W/R controller) 7 via a preamplifier 8. The electromagnet 5 disposed near the GMR head is connected to an electromagnet controller 6 to control a current supplied to the electromagnet 5. The electromagnet controller 6 is connected to both the W/R controller 7 and a floating magnetic field sensor 9.

The GMR head is currently used as a read-only head. Therefore, it is preferable to control the electromagnet 5 such that the electromagnet 5 applies an external magnetic field only during a data reading. For example, a sense current is supplied to the GMR element only during the data reading time and, at the same time, a current is supplied to the electromagnet so as to generate a predetermined magnetic field. In other words, the W/R controller 7 supplies a sense current to the GMR head via the preamplifier 8, and at the same time, outputs an electromagnet driving signal to the electromagnet controller 6. As a result, the electromagnet controller 6 supplies a predetermined current to the electromagnet 5.

Based on the above arrangement, the electromagnet driving signal is not supplied to the electromagnet controller 6, and the electromagnet 5 is not driven during a data writing period or during idling. Therefore, the external magnetic field generated by the electromagnet 5 does not give disadvantageous effects to the surrounding. While the electromagnet driving signal is used to supply a sense current in the present example, another unit for detecting a data reading time can be used to give a corrected magnetic field only during a data reading time.

When the magnetic recording and reproducing apparatus once fails in reading data, the apparatus can read the data again. For example, when a GMR head that has the optimum bias without applying an external magnetic field fails in reading data during the use of the apparatus, the GMR head reads the data again. In this case, the electromagnet 5 according to the present invention can be used to apply an external magnetic field, thereby reading the data again. The W/R controller 7 can be configured to output a re-reading command to operate the electromagnet controller 6. With this arrangement, the GMR head can read the data again with improved reproduction sensitivity, and can increase the probability of successful reading of the data.

When the data reading is unsuccessful even after adjusting the head reproduction sensitivity by applying an external magnetic field from the electromagnet 5, the electromagnet 5 can be controlled so as to be able to apply an external magnetic field in higher intensity to carry out re-reading of the data.

The external magnetic field generated by the electromagnet 5 can be used to remove the effect of a floating magnetic field. In other words, when a floating magnetic field generated within the apparatus gives a disadvantageous effect, the floating magnetic field sensor 9 that detects this floating magnetic field is provided. When the sensor 9 detects the floating magnetic field, the electromagnet controller 6 can control the electromagnet 5 so as to generate a magnetic field that cancels the floating magnetic field.

According to the present invention, the electromagnet 5 applies a magnetic field at the outside of the head 2. Therefore, when a magnetic flux is concentrated to a magnetic pole of the writing head adjacent to the GMR head, there is a risk that the data recorded on the medium is erased depending on the size of the magnetic field. Particularly, when data is recorded perpendicularly to the recording medium, the data can be erased by a smaller magnetic field than that when the data is recorded in-plane. Therefore, in order to avoid the risk of data erasure, it is necessary to obtain an upper limit of a magnetic field at which the data written onto the medium is not erased, and to control the application magnetic field such that the magnetic field does not exceed the upper limit.

Figure 5:
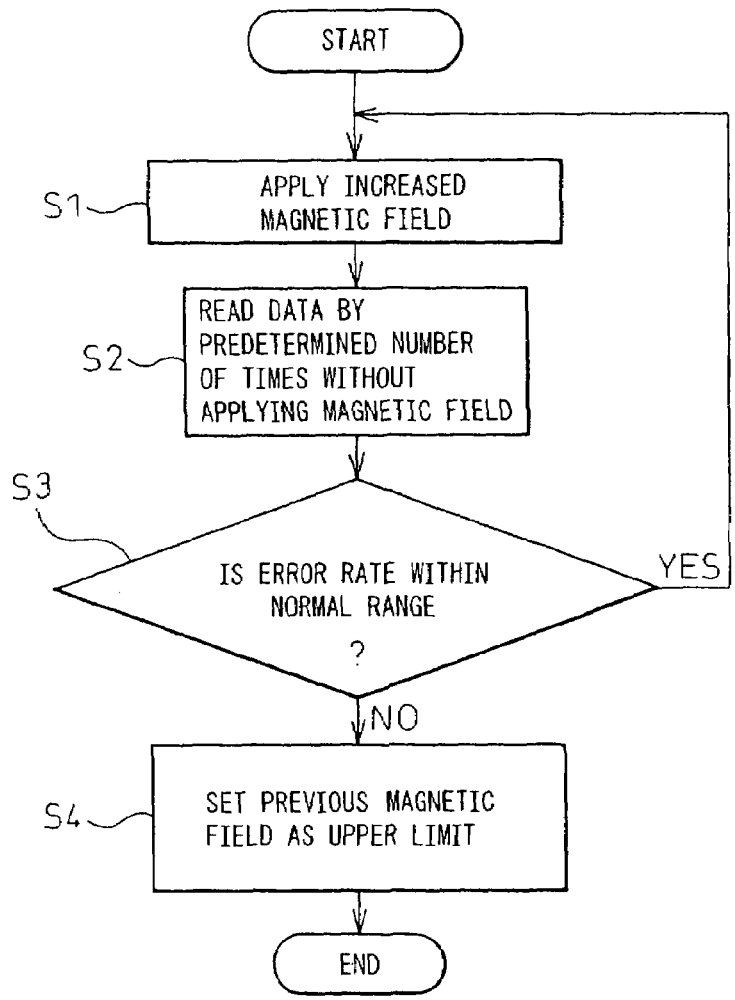
FIG. 5 is a flowchart showing a process of obtaining an upper limit of an application magnetic field.

To obtain an upper limit of the application magnetic field, a method shown in FIG. 5, for example, can be used.

At step S1, the electromagnet increases an applied magnetic field after confirming that the apparatus is not reading data. If no magnetic field is being applied, the electromagnet applies a magnetic field by increasing a magnetic field application level to a predetermined level starting from a magnetic field of zero.

After a predetermined time interval, at step S2, the magnetic field is returned to a non-application state, and the reading head reads data a predetermined number of times.

At step S3, an error rate (i.e., a ratio of the number of times when data cannot be read successfully to a total number of times when a data-reading operation is carried out) is calculated, and it is decided whether the error rate is within a normal range.

When the error rate is within a normal range, the process returns to step S1, and a magnetic field level is further increased by a predetermined value. The operation at steps S2 and S3 is repeated.

When the error rate is out of the normal range (for example, $10^{-8}$) at step S3, the magnetic field level at which the error rate is within the normal range is set as an upper limit of the application magnetic field, at step S4.

The upper limit is used to determine an upper limit of a current that is supplied to the electromagnet 5. The electromagnet controller 6 controls the current supplied to the electromagnet 5 so as not to exceed the upper limit current.

The upper limit of the application magnetic field is usually set at a stage of shipment from the maker. Instead of this stage, the upper limit of the application magnetic field can be suitably set after the head is built into the magnetic recording and reproducing apparatus, for example, immediately after the power source is turned on or at a periodical inspection time. When the setting of the upper limit of the application magnetic field is updated during a usage of the magnetic recording and reproducing apparatus, more stable operation of the head can be secured.

While the GMR element is explained above as an example of the magnetoresistive effect, the present invention can be similarly applied to an AMR (anisotropic magnetoresistive) element and a TMR (tunnel magnetoresistive) element.

What is claimed is:

1. A magnetic recording and reproducing apparatus having a magnetoresistive element, the apparatus comprising an electromagnet for applying a magnetic field by direct current to the magnetoresistive element to correct a misaligned magnetization direction of the magnetoresistive element.

2. The magnetic recording and reproducing apparatus according to claim 1,
wherein the electromagnet applies a magnetic field to the magnetoresistive element in the height direction of the magnetoresistive element.

3. The magnetic recording and reproducing apparatus according to claim 1,
wherein the magnetoresistive element is a giant magnetoresistive element having a free layer, and the electromagnet corrects a misaligned magnetization direction of the free layer of the giant magnetoresistive element.

4. The magnetic recording and reproducing apparatus according to claim 1, further comprising a controller that controls the electromagnet to adjust a magnetization direction and magnetic field intensity of the magnetoresistive element.

5. The magnetic recording and reproducing apparatus according to claim 4,
wherein the controller controls the electromagnet to generate a magnetic field only during a data reading time.

6. The magnetic recording and reproducing apparatus according to claim 4,
wherein the controller controls the electromagnet such that the intensity of a magnetic field generated by the electromagnet is within an intensity range of the magnetic field in which data of a magnetic recording medium is not erased.

7. A magnetic recording and reproducing apparatus having a magnetoresistive element, the apparatus comprising an electromagnet for applying a magnetic field to the magnetoresistive element to correct a misaligned magnetization direction of the magnetoresistive element and a controller that controls the electromagnet to adjust a magnetization direction and magnetic field intensity of the magnetoresistive element,
wherein the controller controls the electromagnet to increase the intensity of an application magnetic field only during a data re-reading time.

8. A magnetic recording and reproducing apparatus having a magnetoresistive element, the apparatus comprising an electromagnet for applying a magnetic field to the magnetoresistive element to correct a misaligned magnetization direction of the magnetoresistive element and a controller that controls the electromagnet to adjust a magnetization direction and magnetic field intensity of the magnetoresistive element,
wherein the controller controls the electromagnet to increase the intensity of the magnetic field of the electromagnet during a period other than a reading time, and during a reading time, the controller controls the electromagnet to read data without applying the magnetic field, and to detect an error rate, thereby setting an intensity range of the magnetic field applied by the electromagnet.

* * * * *